March 12, 1957     T. BRENDEL     2,784,642
THREE-MEMBERED PHOTOGRAPHIC OBJECTIVE
Filed Nov. 21, 1952
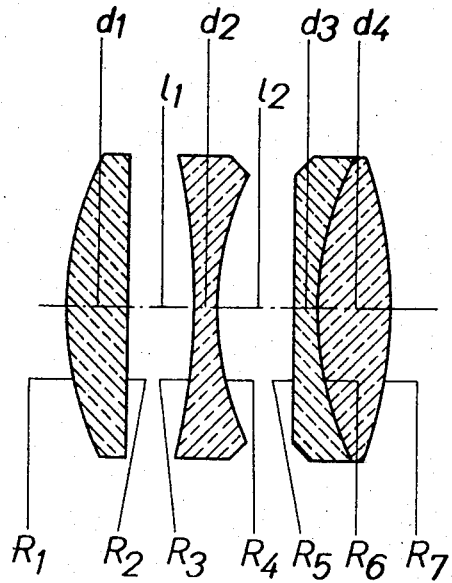
INVENTOR
THEODOR BRENDEL
By Connolly and Hutz
HIS ATTORNEYS

United States Patent Office 2,784,642
Patented Mar. 12, 1957

2,784,642

THREE-MEMBERED PHOTOGRAPHIC OBJECTIVE

Theodor Brendel, Munich, Germany, assignor to Agfa Camera-Werk Aktiengesellschaft, Munich, Germany, a corporation of Germany Application November 21, 1952, Serial No. 321,918

Claims priority, application Germany December 22, 1951

4 Claims. (Cl. 88—57)

The present invention relates to an improved wide aperture photographic objective (lens combination) which is corrected for spherical and chromatic aberrations, coma, astigmatism, field curvature and distortion; and which consists of three members separated from each other by air spaces. More particularly, the invention relates to an objective in which a central single diverging, bi-concave lens is surrounded by two converging members, one of which is positioned in front and consists of a single lens; while the other one is positioned to the rear or behind the bi-concave lens and consists of a cemented member made up of a diverging and a converging portion. The placing of the cemented surface convex towards the interior of the objective provides a converging effect.

The invention specifically relates to an objective of the kind described, wherein the radius of curvature of the first lens surface ($R_1$) ranges between 0.3 times and 0.4 times the focal distance ($f$), and the sum of the absolute values of the radii of curvature of both outer surfaces of the objective ($R_1 + |R_7|$) is smaller by between 0.155 times and 0.3 times the focal distance ($f$) than the sum of the absolute values of the radii of curvature of both concave surfaces of the diverging single lens ($|R_3| + _4$).

Present commercially available objectives of the above-identified type are corrected for longitudinal and lateral color, spherical and chromatic aberrations, coma, astigmatism, field curvature and distortion to certain limited degrees. There is a certain manifest insufficiency in these prior art objective systems, however, particularly with reference to use for photographic purposes in which very sharp image definitions and both good contrast and good resolution are required. In particular, it is necessary that the lens system provide a high degree of uniform illumination throughout the required angular field. These desirable effects, however, have not heretofore been included in existing tri-component lens systems.

It is therefore a primary object of the instant invention to provide an objective for photographic purposes which will provide optical images of the desirable characteristics above enumerated. It is a further object of the instant invention to provide an objective lens system having a wide aperture picture field while retaining optical images of good contrast and resolution. It is a still further object of the instant invention to provide an objective having an increased overall picture capacity.

It was found that in the case of objectives displaying the above-mentioned characteristics a substantially better picture capacity can be attained if, according to the invention, the glasses are so chosen that the index of refraction (with reference to the $d$-line of the spectrum 587.6 m$\mu$) in the diverging single lens ($n_2$) ranges between 1.59 and 1.62 while the difference between this index of refraction ($n_2$) and that one in the diverging portion of the cemented member ($n_3$) lies between 0.02 and 0.045; while the index of refraction in the converging single lens ($n_1$) is at least 1.635 but does not exceed the index in the converging portion of the cemented member ($n_4$) and the difference of the refraction indices in both the single lens ($n_1 - n_2$) ranges between 0.034 and 0.12.

By means of the described distribution of glasses of higher refraction to the converging elements and of glasses of substantially lower refraction to the diverging elements of the system, it is possible substantially to strengthen the favorable effect upon the Petzval-total and thereby upon the correction of the outer axial picture points, which in this type of objective is inherently already attained through the characteristic position of the individual lenses. With good spherical and comatic correction there remains in this case the further possibility of a very far reaching elimination of color defects.

Reference will now be made to the drawing in describing certain specific examples of the invention and in which The single figure is a schematic illustration of an objective lens system according to the invention.

With reference to the single figure of the drawing the invention may be succinctly defined in its generic or broadest aspects as comprising an objective lens system expressed in the customary formula representation as follows:

$$0.3f \leqslant R_1 \leqslant 0.4f$$
$$0.155f \leqslant (|R_3| + R_4) - (R_1 + |R_7|) \leqslant 0.3f$$
$$1.59 \leqslant n_2 \leqslant 1.62$$
$$0.02 \leqslant n_2 - n_3 \leqslant 0.045$$
$$1.635 \leqslant n_1 \leqslant n_4$$
$$0.034 \leqslant n_1 - n_2 \leqslant 0.12$$

The drawing represents a schematic section through an objective according to the present invention. Therein the radii of curvature are indicated with R, the thickness with $d$ and the air spaces with 1. The given figures for radii, thicknesses and air spaces apply to a focal length $f=1,000$. The relative aperture amounts to 1:3.5.

A particularly good correction of all picture defects and one extending over the entire picture field of about 50° is attained, if according to its absolute values, the radius of curvature of the last objective surface ($|R_7|$) is greater than the radius of curvature of the first objective surface ($R_1$) by at least 0.1 times but not greater than 0.2 times the focal distance of the objective ($f$), and furthermore, the radius of curvature of the surface ($|R_3|$) of the diverging single lens which faces the converging single lens according to its absolute values ranges between 4.7 times and 5.7 times the difference between the absolute values of the radii of curvature of both of the exterior surfaces ($|R_7|$ and $R_1$) of the objective.

This condition may be expressed in the customary formula representations as follows:

$$0.1f \leqslant |R_7| - R_1 \leqslant 0.2f$$
$$4.7 \leqslant R_3 : (|R_7| - R_1) \leqslant 5.7$$

A further increase of the picture capacity is attained if the radius of curvature of the cemented surface ($R_6$) is between 0.3 times and 0.4 times the focal length, and the radius of curvature of the surface ($R_4$) of the diverging single lens facing the cemented member ranges between 0.26 times and 0.36 times the focal length of the objective ($f$).

This condition may be expressed in the customary formula representations as follows:

$$0.3f \leqslant R_6 \leqslant 0.4f$$
$$0.26f \leqslant R_4 \leqslant 0.36f$$

The above recited examples outline several preferred embodiments of the invention with respect to the critical limitations necessary to the obtaining of the desirable improvements according to the invention. Several preferred exemplary forms of specific objective lens system according to the above generic concepts of the invention will now be enumerated:

EXAMPLE I

| Radius | Thickness or air separation | Refractive index $N_d$ | Abbé $\nu$ number |
|---|---|---|---|
| $R_1=+0.32074$ | $d_1=0.05316$ | $n_1=1.64251$ | $\nu_1=58.3$ |
| $R_2=\infty$ | $l_1=0.05465$ | | |
| $R_3=-0.66572$ | $d_2=0.01490$ | $n_2=1.60772$ | $\nu_2=40.2$ |
| $R_4=+0.29610$ | $l_2=0.07452$ | | |
| $R_5=-3.87508$ | $d_3=0.01590$ | $n_3=1.58258$ | $\nu_3=40.6$ |
| $R_6=+0.30603$ | $d_4=0.06955$ | $n_4=1.66713$ | $\nu_4=48.2$ |
| $R_7=-0.43891$ | | | |

EXAMPLE II

| Radius | Thickness or air separation | Refractive index $N_d$ | Abbé $\nu$ number |
|---|---|---|---|
| $R_1=+0.31871$ | $d_1=0.05052$ | $n_1=1.67786$ | $\nu_1=55.3$ |
| $R_2=+4.80071$ | $l_1=0.05685$ | | |
| $R_3=-0.75409$ | $d_2=0.01802$ | $n_2=1.60565$ | $\nu_2=37.9$ |
| $R_4=+0.28297$ | $l_2=0.06970$ | | |
| $R_5=-3.45313$ | $d_3=0.01772$ | $n_3=1.56248$ | $\nu_3=50.9$ |
| $R_6=+0.32133$ | $d_4=0.06834$ | $n_4=1.67786$ | $\nu_4=55.3$ |
| $R_7=-0.46925$ | | | |

EXAMPLE III

| Radius | Thickness or air separation | Refractive index $N_d$ | Abbé $\nu$ number |
|---|---|---|---|
| $R_1=+0.31993$ | $d_1=0.04999$ | $n_1=1.69100$ | $\nu_1=54.8$ |
| $R_2=+3.59924$ | $l_1=0.05999$ | | |
| $R_3=-0.79983$ | $d_2=0.02000$ | $n_2=1.61293$ | $\nu_2=37.0$ |
| $R_4=+0.27994$ | $l_2=0.06999$ | | |
| $R_5=-3.99916$ | $d_3=0.02000$ | $n_3=1.57135$ | $\nu_3=53.0$ |
| $R_6=+0.31193$ | $d_4=0.06999$ | $n_4=1.69100$ | $\nu_4=54.8$ |
| $R_7=-0.48672$ | | | |

In the above listed data for the construction of three specific examples according to the invention, the notation for the successive radii of curvature is listed as $R_1$, $R_2$, etc., and the + sign denotes that the curve is convex towards the incident light and the − sign denotes that the curve is concave towards the same.

One of the primary advantages of an objective lens system according to the instant invention is the retention of a relatively low Petzval total while simultaneously obtaining wide aperture picture fields with substantially uniform illumination. A further feature of the instant invention resides in the provision of such type lens system while still eliminating astigmatism and providing improved performance off of the optical axis.

As many apparently widely different embodiments of the above invention may be made without departing from the spirit and scope hereof, it is to be understood that the invention is not limited except as defined in the appended claims.

What is claimed is:
1. A photographic objective corrected for spherical and chromatic aberrations, coma, astigmatism, field curvature and distortion, and consisting of three members separated from each other by air spaces, said objective being arranged in such a manner that a diverging bi-concave single lens is surrounded by two converging members of which the one in front is a single lens and the one in back is a cemented member composed of a diverging and a converging part, whose convex cemented surface facing the objective interior possesses a collecting effect, and wherein the radius of curvature of the first objective surface ($R_1$) ranges between 0.30 times and 0.4 times the focal length ($f$) of the objective and the sum of the absolute values of the radii of curvature of both exterior surfaces of the objective ($R_1$ and $|R_7|$) is less by at least 0.155 times but not exceeding 0.3 times the focal length ($f$) than the sum of the absolute values of the radii of curvature of both concave surfaces of the converging individual single lens ($|R_3|+R_4$), characterized in that the refractive index with reference to the $d$-line of the spectrum (587.6 m$\mu$) in the diverging single lens ($n_2$) ranges between 1.59 and 1.62 while the difference between this refractive index ($n_2$) and that one in the diverging portion of the cemented member ($n_3$) lies between 0.02 and 0.045; and the refractive index in the converging single lens ($n_1$) is at least 1.635, but does not exceed the index in the converging portion of the cemented member ($n_4$), and the difference of the refractive indices in both of the single lenses ($n_1-n_2$) ranges between 0.034 and 0.12.

2. A photographic objective according to claim 1 characterized in that according to its absolute values the radius of curvature of the last objective surface ($R_7$) is by at least 0.1 times but not more than 0.2 times the focal length ($f$) greater than the radius of curvature of the first objective surface ($R_1$), and furthermore, the radius of curvature of the surface ($R_3$) of the diverging single lens, that faces the collecting single lens, according to its absolute values ranges between 4.7 times and 5.7 times the difference of the absolute values of the radii of curvature of both exterior surfaces ($R_7-R_1$) of the objective.

3. A photographic objective according to claim 1, characterized in that the radius of curvature of the cemented surface ($R_6$) ranges between 0.3 times and 0.4 times the focal length ($f$), and the radius of curvature of the surface ($R_4$) of the diverging single lens that faces the cemented member ranges between 0.26 times and 0.36 times the focal length of the objective.

4. In a photographic objective comprising three lens elements constituting a front, center and rear lens separated by air spaces, in which the center lens is a single diverging bi-concave lens, the rear lens is a cemented member comprising a diverging and a converging portion, and the front lens is a converging lens, the improvement which comprises, said front lens having a first radius of curvature ranging between 0.3 times and 0.4 times the focal distance of the objective and a second radius of curvature which is between plane and + 5.0 times the focal length of the objective and an index of refraction $N_d$ greater than 1.635 but not exceeding the index of the converging portion of the cemented member, said center lens having an index of refraction $N_d$ between 1.59 and 1.62 and a first and second radius of curvature whose absolute arithmetic sum reduced by the absolute arithmetic sum of the first radius of curvature of the front lens and the second radius of curvature of the converging portions of the rear lens is between 0.155 times and 0.3 times the total focal length, said diverging portion of said rear lens having an index of refraction $N_d$ which is at least 0.02 but not exceeding 0.045 less than the index of refraction $N_d$ for said center lens and a second radius of curvature which is substantially equal to the first radius of curvature of said collecting portion.

References Cited in the file of this patent
UNITED STATES PATENTS

| | | |
|---|---|---|
| 721,240 | Rudolph | Feb. 24, 1903 |
| 1,741,947 | Merte | Dec. 31, 1929 |
| 1,849,681 | Merte et al. | Mar. 15, 1932 |
| 1,924,527 | Tronnier | Aug. 29, 1933 |
| 2,084,714 | Tronnier | June 22, 1937 |
| 2,158,178 | Frederick | May 16, 1939 |
| 2,601,369 | Cook | June 24, 1952 |